(No Model.)

J. V. ROWLETT.
RAKE.

No. 479,842.  Patented Aug. 2, 1892.

Witnesses:

Inventor:
Jacob V. Rowlett
By _____
his Attorney

UNITED STATES PATENT OFFICE.

JACOB V. ROWLETT, OF RICHMOND, INDIANA.

RAKE.

SPECIFICATION forming part of Letters Patent No. 479,842, dated August 2, 1892.

Application filed June 16, 1891. Serial No. 396,482. (No model.)

*To all whom it may concern:*

Be it known that I, JACOB V. ROWLETT, a citizen of the United States, residing at Richmond, in the county of Wayne and State of Indiana, have invented certain new and useful Improvements in Rakes; and I do hereby declare the following to be a full, clear, and exact description of the invention, such as will enable others skilled in the art to which it appertains to make and use the same.

This invention relates to rakes of novel construction, and has for its object to overcome the difficulties arising in rakes heretofore employed—such as penetrating the earth and cutting the roots of the grass—and to provide other features of a construction which tend to increase the efficiency of the implement.

To these ends my invention may be said to consist generally in a rake in which each successive pair of teeth is joined together at their outer ends and which is formed with a point at such intersection of short length and terminating at its inner end with shoulders formed by the intersecting teeth, whereby the penetration of the ground is effectually prevented.

The invention also consists in providing a hood formed integral with the rake-head for preventing the discharge of the grass or refuse over the top thereof and in providing novel means for connecting together the handle-brace and rake-head, all of which will be presently fully explained in the following description, and specifically pointed out in the claims.

Figure 1:
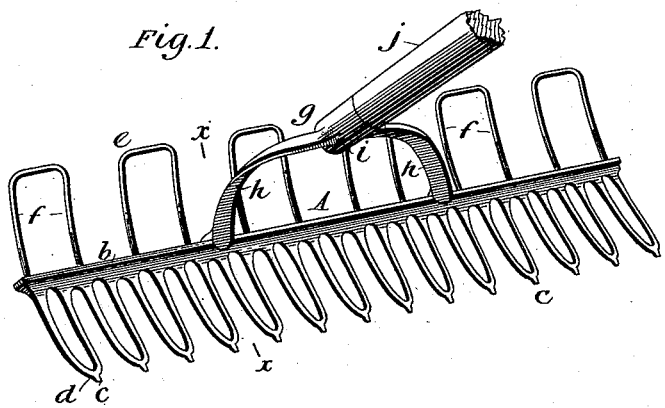
Figure 2:
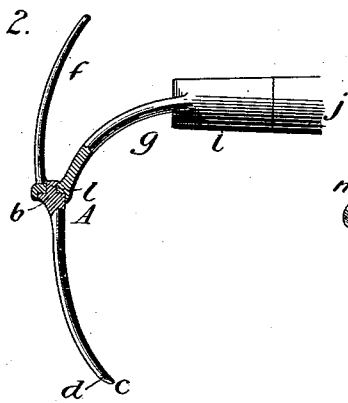
Figure 3:
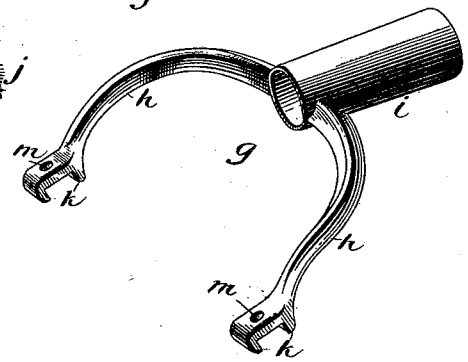

Upon reference being had to the accompanying drawings, which form a part of this specification, Figure 1 illustrates in perspective view my improved rake; Fig. 2, a section through line $x\,x$, Fig. 1; and Fig. 3 is a detail in perspective of the handle-brace and the lower portion of the handle.

Similar letters of reference in all the figures denote corresponding parts.

The letter A denotes the rake-head, which is formed of steel, preferably cast, but which may be made also from solid sheet-steel by blocking or stamping it therefrom and forming it into shape afterward. Extending from the central portion $b$ of the head are a series of teeth arranged in pairs, the teeth of each pair converging and meeting at their outward ends, as shown.

$c$ represents the points which are formed at the intersection of the teeth and which extend outward for a short distance from the curved portions of the intersecting teeth, which form with said points suitable shoulders $d$, which in operation pass over the surface of the ground and prevent the teeth from penetrating too deeply, which would tend to cut the roots of the grass and destroy its life.

$e$ represents a hood, which is formed integral with the central portion and consists of a series of fingers $f$, arranged in pairs and connected at their outer ends, as shown. By reason of this hood the grass and other rakings are prevented from discharging over the top of the rake, and it also serves as a convenient carrier for the rakings. The teeth and fingers are preferably curved, as shown, and this is especially desirable for the teeth, as it enables the points thereof in operation to assume a line parallel, or nearly so, with the surface of the ground.

$g$ denotes the handle-brace, which is formed of two converging arms $h\,h$, which terminate at their intersection with a sleeve $i$ for the handle $j$. At the free end of each of these arms are flanges $k\,k$, which form a socket to receive the central portion of the rake. Lugs $l$, formed integral with the rake-head, are adapted to enter the holes $m$ in the arms $h$ and be upset to form rivets for securing the brace to the head. By this means the brace is securely connected to the head and cannot become loosened or detached therefrom with ordinary use.

I claim—

1. In a rake, the combination, with a head, of a series of teeth formed integrally therewith and arranged in pairs, each tooth of each pair converging at its outer end toward the other, short solid points arranged at the intersection of each pair, and the hood constituted of a series of fingers integral with the head and extending outwardly therefrom and connected in pairs, all substantially as and for the purposes set forth.

2. In a rake, the combination, with the head or central portion formed with upwardly-extending lugs or projections adapted to be upset, of a handle-brace constituted of arms united at one end with a sleeve for the handle, the other ends having sockets formed by flanges, said sockets having apertures therein engaging with the lugs and the flanges with the rake-head, substantially as described.

In testimony whereof I affix my signature in presence of two witnesses.

JACOB V. ROWLETT.

Witnesses:
CHAS. C. GEHRING,
EDWIN S. ROWLETT.